United States Patent [19]
Meckstroth et al.

[11] Patent Number: 5,752,891
[45] Date of Patent: May 19, 1998

[54] ELECTRONICALLY CONTROLLED ACCESSORY DRIVE SYSTEM FOR THE AUTOMOTIVE ENGINE

[75] Inventors: Richard J. Meckstroth, Northville; Gerard S. Toth, Belleville, both of Mich.

[73] Assignee: Ford Global Technologies, Inc., Dearborn, Mich.

[21] Appl. No.: 406,438

[22] Filed: Mar. 20, 1995

[51] Int. Cl.$^6$ ................................................ F16H 7/08
[52] U.S. Cl. ................................. 474/110; 474/135
[58] Field of Search .......................... 474/133, 101, 474/110, 135, 138

[56] References Cited

U.S. PATENT DOCUMENTS

| | | | |
|---|---|---|---|
| 1,701,820 | 12/1929 | Morse | 474/135 X |
| 3,136,170 | 6/1964 | Murray | 474/135 |
| 5,131,889 | 7/1992 | Meckstroth et al. | 474/117 |
| 5,197,010 | 3/1993 | Andersson | 364/463 |
| 5,256,113 | 10/1993 | Bushman et al. | 474/135 |
| 5,277,281 | 1/1994 | Carlson et al. | 188/267 |
| 5,353,839 | 10/1994 | Kordonsky et al. | 137/806 |
| 5,396,973 | 3/1995 | Schwemmer et al. | 188/299 |
| 5,439,420 | 8/1995 | Meckstroth et al. | 474/133 |
| 5,452,745 | 9/1995 | Kordonsky et al. | 137/807 |

FOREIGN PATENT DOCUMENTS 279415  3/1952  France.

Primary Examiner—Roger J. Schoeppel
Attorney, Agent, or Firm—Jerome R. Drouillard

[57] ABSTRACT

An electronically controlled accessory drive system for an automotive engine includes a drive pulley attached to an output shaft of the engine and a flexible drivebelt for connecting the drive pulley with driven pulleys. A tensioner maintains the drivebelt in contact with each of the drive and driven pulleys. The tensioner includes an arm which is rotatably mounted to the engine, and has a wheel for contacting the drivebelt. The wheel is urged into contact with the drivebelt by the arm, with the tensioner further including a governor for controlling rotational motion of the arm, with the arm being able to rotate freely in the direction toward the drivebelt, with the governor resisting motion of the arm in the direction in which tension in the drivebelt is decreased. Motion of the governor is controlled by an electronic controller which operates a magnetic coil disposed about a fluid passage through which a magnetorheological fluid must pass as the tensioner arm rotates.

9 Claims, 3 Drawing Sheets

5,752,891

ELECTRONICALLY CONTROLLED ACCESSORY DRIVE SYSTEM FOR THE AUTOMOTIVE ENGINE

BACKGROUND OF THE INVENTION

The present invention relates to a belt-driven automotive engine accessory drive system and means for tensioning such a system. Drive systems for the front end accessories of automotive engines typically include a belt having a tensioning device for maintaining the belt in contact with all the pulleys of the system, including the drive pulley, which is usually attached to the crankshaft of the engine, as well as with a plurality of driven pulleys, with at least one driven pulley attached to each rotating accessory. Such accessories frequently include an alternator, a power steering pump, an air conditioning compressor, a secondary air pump for emission controls, and other types of rotating devices.

Conventional tensioners utilize elastic force provided by, for example, a flat wire spring for maintaining a tensioning pulley in contact with the drive belt. Such a pulley is shown as item No. 34 in FIG. 1 of the present application. Although damped tensioners have been used to some extent in automotive front end accessory drive systems, such tensioners are typically mechanically controlled and are therefore unable to adapt to changing engine operating conditions with the rapidity which would otherwise be desirable. A tensioner and control system according to the present invention allows the tensioner to move with only minimal resistance in the direction toward the drive belt, but is commanded electronically to resist motion in either direction during predetermined engine operating conditions.

FIG. 4 illustrates a problem with conventional tensioners which is solved by a tensioner according to the present invention. Operation of a front end accessory drive system with a corrective tensioner according to the present invention is shown in FIG. 5. Both plots illustrate the rotational speed or angular velocity of an engine's alternator, idler pulley, and crankshaft pulley. The rotational speed of the idler pulley is a direct indicator of the speed of the drivebelt because it is assumed for the purpose of this discussion that minimal slip occurs between the idler pulley and the drivebelt; this is a good assumption because the rotating inertia of the idler pulley is relatively slight as compared with the rotational inertia of the other driven components of the engine's front end accessory drive system, particularly the alternator. As shown in both plots, crankshaft rpm decreases at a very high rate in the situation being considered. It has been determined that during wide open throttle transmission upshifts at lower gear speeds, such as the upshift from first to second gear with an automatic transmission at an engine speed of, for example 4500 rpm, the crankshaft may decelerate at a rate approaching 20,000 rpm per second. These high deceleration rates cause the front end accessory drivebelt to slip on one or more pulleys, particularly the crankshaft pulley, thereby giving an objectionable squealing noise which will be audible to the driver of the vehicle. The squealing noise produced by the loose drivebelt slipping on the crank pulley is caused by an overrunning effect of the alternator. FIGS. 4 and 5 show rotational speed data produced during tests in which an instrumented engine was rapidly decelerated from a high rate of speed. FIG. 4 illustrates the behavior of a prior art system; FIG. 5 illustrates a system according to the present invention. As shown in FIG. 4, alternator speed tails off to zero at about 300 msec. after the crankshaft stops. Similarly, the idler rpm and drivebelt speed tail off to zero at about 200 milliseconds following the stopping of the crankshaft. This occurs because once the crankshaft stops, the high rotational inertia of the alternator causes it to remain rotating and causes the alternator to pull the tensioner in a direction so as to loosen the belt. In turn, this causes a "bubble" of belt to extend from the alternator to the crankshaft pulley, and as a result the drivebelt slips on the crankshaft pulley. The resultant squeal may be very audible. In contrast with the operation according to the conventional tensioner in FIG. 4, FIG. 5 shows the results of the use of a tensioner and control system according to the present invention. In essence, the rotational motion of the tensioner arm is controlled such that the tensioner's arm will be able to rotate in the direction toward the drivebelt with only a low level of resistance to motion of the tensioner, while movement of the arm in the direction lifting off the belt is subject to a much higher level of resistance. Because the tensioner cannot move readily in the direction of lifting off the belt, tension within the drivebelt is maintained at all points within the drive system, and, as a result, the deceleration rates of the drivebelt, the alternator and the crankshaft converge. This is shown graphically in FIG. 5. Note that the three plots for alternator, idler and crankshaft all converge at a about 1100 msec. This means effectively that the alternator is no longer permitted to pull the tensioner in a direction tending to extend the belt, and as a result, tension is maintained in the belt at the alternator, which is decelerated in close congruence with the crankshaft's deceleration. This has the beneficial effect of preventing squeal of the drivebelt at the crank pulley, because with the tension maintained at a proper level in the drivebelt, the belt will not slip at the crankshaft pulley. U.S. Pat. No. 5,439,420, which issued to the inventors of the present invention, discloses an accessory drive system tensioner having similar construction to the system disclosed in the present specification.

SUMMARY OF THE INVENTION

An accessory drive system for an automotive engine includes a drive pulley attached to an output shaft of the engine, a flexible drivebelt for connecting the drive pulley with a plurality of driven pulleys, with one driven pulley located on each of a plurality of driven devices, and a tensioner for maintaining the drivebelt in contact with each of the drive and driven pulleys. The tensioner comprises an arm which is rotatably mounted to the engine and which has a wheel for contacting the drivebelt, with the wheel being urged into contact with the drivebelt by the arm, with the tensioner further comprising a governor for controlling rotational motion of the arm such that the arm and wheel will be able to rotate toward the drivebelt with only minimal resistance, with the governor vigorously resisting the motion of the arm and wheel away from the drivebelt. The governor comprises a strut interposed between the tensioner arm and a mounting surface fixed to the engine adjacent the tensioner, such that linear motion of the strut accompanies rotational motion of the arm. The strut preferably has a connecting rod portion which is able to move with only minimal resistance in the direction in which the tensioner wheel moves toward the drivebelt, while vigorously resisting movement in the direction away from the drivebelt. The strut preferably comprises a piston reciprocably mounted within a cylinder mounted upon the connecting rod, with the connecting rod having a free end attached to the tensioner arm such that the piston slides within the cylinder as the tensioner arm rotates, with the motion of the piston being controlled by a rheological fluid contained within the cylinder such that the motion of the piston in the direction which allows the tensioner to rotate in the direction toward the drivebelt is substantially uninhibited, with motion of the piston in the direction in which the tensioner moves away from the drivebelt being resisted by hydrostatic force within the cylinder. Hydrostatic force is maintained within the cylinder by causing the rheological fluid leaving the cylinder under compressive force generated by the piston to flow through a selectively restrictive orifice which is either magnetically or electrically controlled. In either case, flow through the selectively restrictive orifice is controlled by an electronic controller such that when no signal is applied to the selectively restrictive orifice, motion of the piston will be only minimally unrestrained in both directions. In general, an electronic controller may be used to operate the selectively restrictive orifice such that rotational motion of the arm is restricted during periods of operation characterized by either rapid engine deceleration or when engine speed exceeds a predetermined value, or both.

It is an advantage of the present invention that a system having a system according to the present invention will resist and prevent unwanted changes in drivebelt tension which may accompany rapid changes in engine speed.

DETAILED DESCRIPTION OF THE PREFERRED EMBODIMENTS

Figure 1:
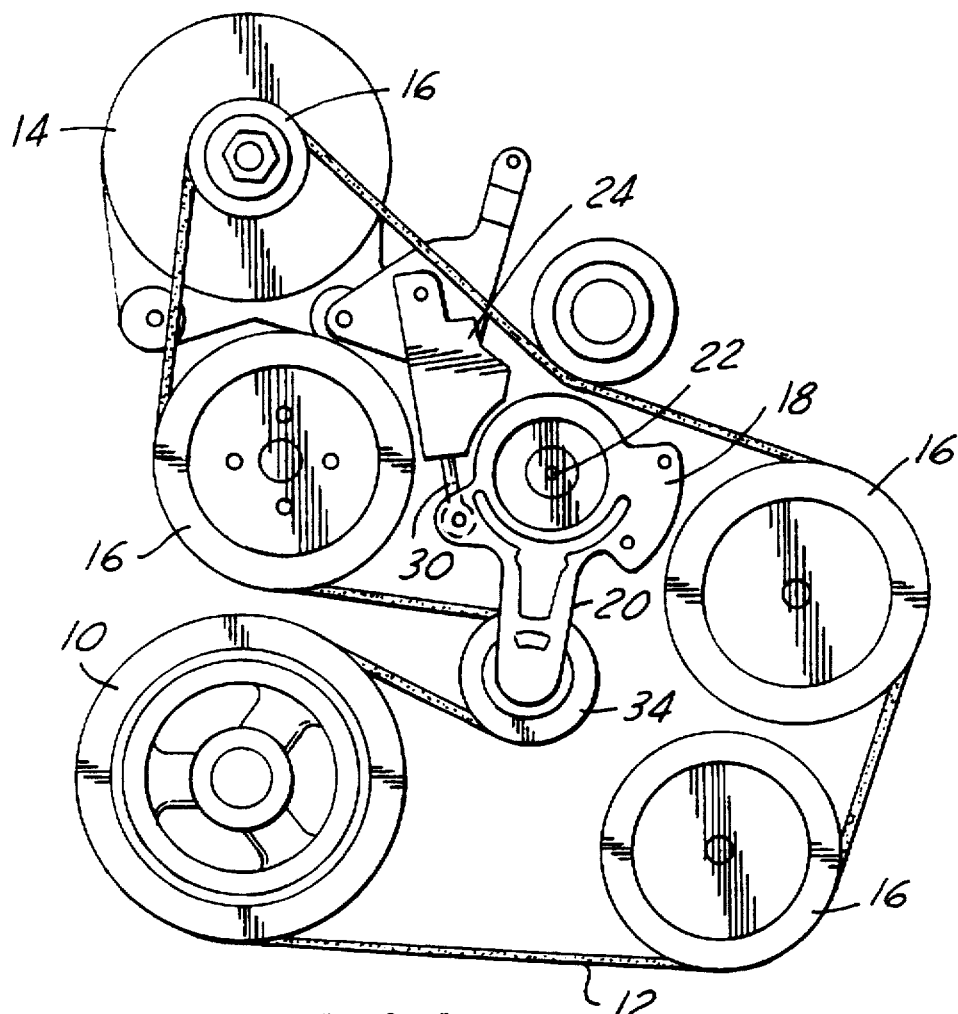
FIG. 1 is a system illustration of a front end accessory drive system according to the present invention.

FIG. 1 illustrates an automotive type internal combustion engine front end accessory drive system according to the present invention. Flexible drivebelt 12, which is driven by pulley 10 attached to the engine's crankshaft, powers a series of rotating accessories which may include an alternator, a power steering pump, an air conditioning compressor, a water pump, an air pump to operate an emission control system, and other rotating accessories known to those skilled in the art. Particularly included in the present combination of accessories is alternator 14 which, due to its high rotational inertia, would normally create a problem which is solved by a tensioner according to the present invention. Tensioner 18, as modified according to the present invention, maintains drivebelt 12 in contact with each of driven pulleys 16, as well as drive pulley 10, so that squealing or other objectionable noises will not occur. This is accomplished by maintaining proper tension in belt 12 at all times.

Figure 2:
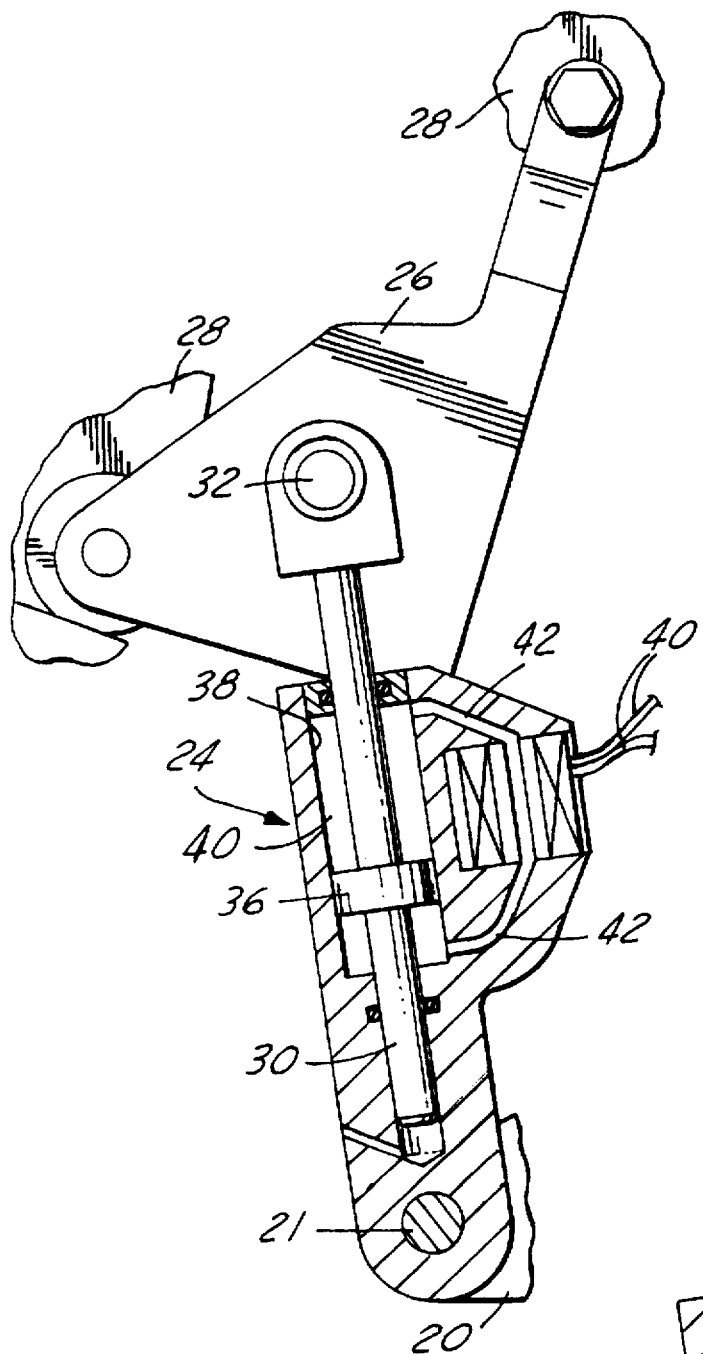
FIG. 2 is a plan view of an electronically controlled strut according to one aspect of the present invention.

FIG. 2 illustrates an example of a rheological strut type of tensioner governor according to the present invention. Accordingly, strut 24 is attached to bracket 26 which is rigidly mounted to front surface 28 of the engine. Strut 24 is attached to bracket 26 by means of mounting pin 32. The strut has connecting rod 30 having a free end which is pivotally mounted to tensioner arm 20 at pivot point 21. Strut 24 also has piston 36 mounted upon connecting rod 30. Piston 36 slides within cylinder 38 while following the rotational motion of arm 20. As seen from FIGS. 1 and 2, motion of arm 20 in the direction away from drivebelt 12 is accompanied by upward motion toward the mounting end of strut 24 at point 32. Conversely, motion of the strut in the direction toward drivebelt 12 is in the direction for piston 36 to move out of cylinder 38. Motion of connecting rod 30 and piston 36 in the direction in which piston 36 is moving in the direction in which connecting rod 30 extends to a greater extent from cylinder 38 is substantially uninhibited because rheological fluid 40 within cylinder 38 is free to flow through passages 42, as long as selectively restrictive orifice 44 is not subjected to an electrical control signal. As long as flow through selectively restrictive orifice 44 is restrained only by the inherent viscosity of rheological fluid 40, movement of piston 36 and connecting rod 30 in both directions is relatively uninhibited. If, on the other hand, the engine slows down precipitously so that alternator 14 would tend to pull arm 20 in the direction of decreased tension in belt 12, piston 36 would be forced in an upward direction, and the flow of rheological fluid from cylinder 38 through passages 42 will be restricted by the application of an electronic field, which is defined herein as being either a magnetic field surrounding selectively restricted orifice 44, or through the application of an electrical force field or potential to the fluid passing through orifice 44. In either case, once passage of the rheological fluid through selectively restrictive orifice 44 is inhibited by the application of the electronic field, motion of piston 36 is essentially restricted by the hydrostatic force built up within cylinder 38. In essence, the motion of the piston may be hydrostatically locked, depending upon the degree of restriction imposed by selectively restrictive orifice 44. In this fashion, tensioner 24 will prevent tension on drivebelt 12 from being released due to the overrunning condition caused by alternator 14 or by any other overrunning accessory, for that matter, thereby preventing drivebelt 12 from slipping on any of the drive or driven pulleys.

Figure 3:
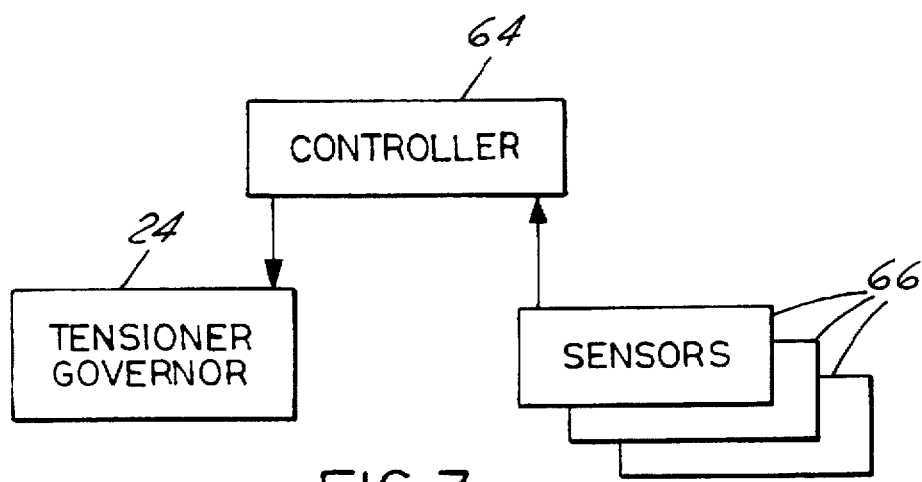
FIG. 3 is a block diagram of a control system for a tensioner according to the present invention.

The device of FIG. 2 includes coil 46, having connecting leads 48. The current through coil 46 is controlled by controller 64, which is shown in FIG. 3. In general a magnetorheological fluid is preferred for fluid 40, because the power requirements for operating selectively restricted orifice 44 with magnetically-induced viscosity changes would be expected to be less than the electrical current requirements associated with the use of a system having a set of electrodes projecting into selectively restricted orifice 44. Coil 46 is disposed about selectively restricted orifice 44, with the center axis of coil 46 being generally coaxial therewith.

Figure 6:
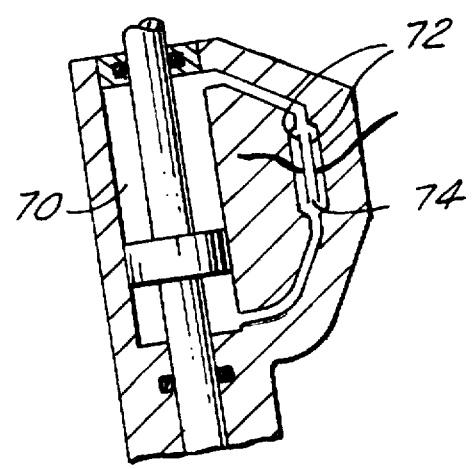
FIG. 6 illustrates an alternative electronically controlled strut according to the present invention.
Figure 4:
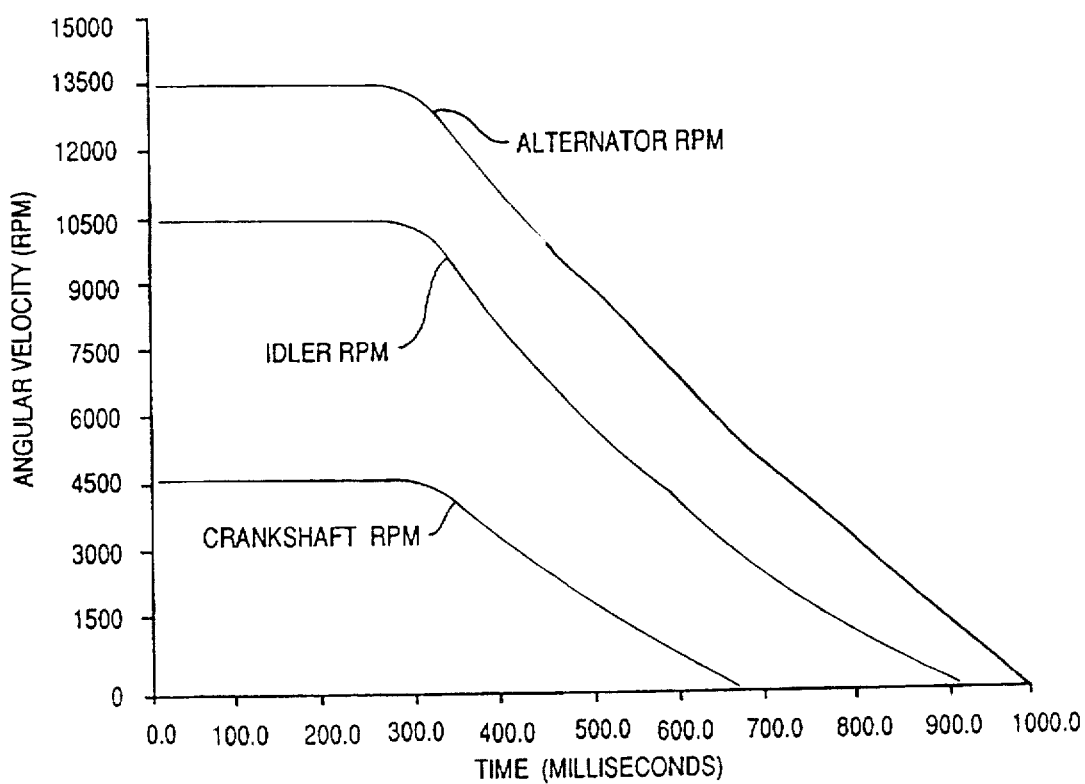
FIGS. 4 and 5 illustrate the operation of a front end accessory drive without and with a control system according to the present invention, respectively.
Figure 5:
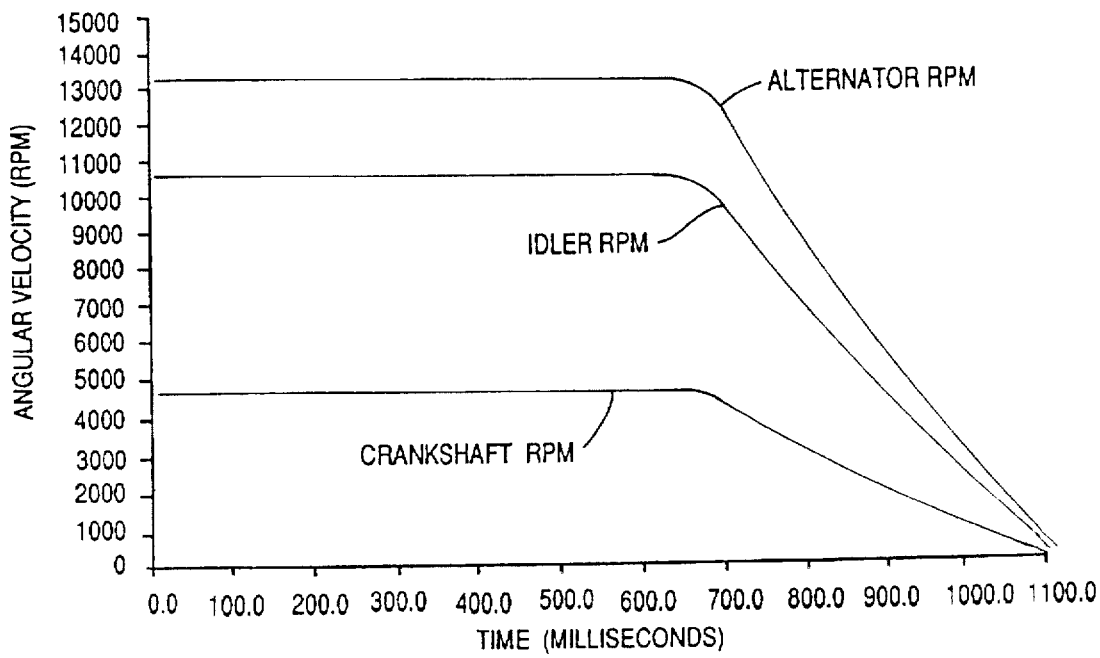

Although magnetorheological fluid is believed to be superior because of lower current requirements, electrorheological fluid 70 may be used, as shown in FIG. 6. In this case, a potential is applied across plates 72 by controller 64, so as to create a field within channel 74, which extends between plates 72. This electrical field causes the viscosity of electrorheological fluid 70 to increase, with the result that the movement of piston 36 will be restricted. Thus, the device of FIG. 6 operates in similar fashion to the device of FIG. 2.

As shown in FIG. 3, controller 64 receives a variety of information signals from a plurality of sensors 66, which may comprise speed sensors indicating the rotational speed of the engine or any other rotating component on the vehicle, or engine acceleration sensors, or other types of sensors known to those skilled in the art of engine control and suggested by this disclosure. In the event that controller 64 senses engine speed above a threshold, for example, or any other operating parameter indicative of engine operation in a mode tending to decrease tension in drivebelt 12 below a threshold at which traction of the belt is adequate to avoid slipping of the belt, controller 64 will direct tensioner governor 24 to change from a mode in which the tensioner compliantly tensions the drivebelt to a mode in which the tensioner non-compliantly tensions the drivebelt so as to prevent the tension from decreasing. In other words, controller 64 will issue a command to strut 24 to increase the flow resistance of fluid 40 through selectively restricted orifice 44. As a result, pulley 34 will be maintained in contact with drivebelt 12 even if the engine decelerates precipitously, because arm 20 will be prevented from rotating away from the belt. And, drivebelt 12 will be prevented from slipping.

Those skilled in the art will appreciate that changes and modifications may be made to the invention described herein, while nevertheless coming under the scope of the following claims. For example, a system according to the present invention could be employed with not only a piston type of governor mechanism, but also with a vane pump type of apparatus housed within the hub of the tensioner arm. In this latter case, the shearing of the fluid within the vane pump may be employed for producing a variable resistance to rotation, with the magnitude of the resistance being dependent upon the magnitude of the magnetic field induced within the fluid working chamber.

We claim:

1. An electronically controlled accessory drive system for an automotive engine, comprising:

a drive pulley attached to an output shaft of the engine;

a flexible drive belt for connecting the drive pulley with a plurality of driven pulleys, with one driven pulley located upon each of a plurality of driven devices; and a tensioner for maintaining the drive belt in contact with each of said drive and driven pulleys, with said tensioner comprising an arm which is rotatably mounted to the engine and which has a wheel for contacting the drive belt, with the wheel being urged into contact with the drive belt by the arm, and with said tensioner further comprising a governor for controlling the rotational motion of the arm, with said governor comprising a hydraulic strut interposed between said tensioner arm and a mounting surface fixed to the engine adjacent the tensioner, such that linear motion of the strut accompanies rotational motion of the arm, with the strut comprising a piston reciprocably mounted within a cylinder upon a connecting rod, with the connecting rod having a free end attached to the tensioner arm such that the piston slides within the cylinder and displaces rheological fluid contained within the cylinder as the tensioner arm rotates, with the motion of the piston being controlled by the rheological fluid such that motion of the piston in the direction which allows the tensioner to rotate away from the drive belt is substantially inhibited by increasing the viscosity of the rheological fluid by imposing an electronic field about a selectively restrictive orifice through which the rheological fluid must flow as the piston moves.

2. An accessory drive system according to claim 1, wherein said electronic field comprises a magnetic field, with said fluid being magnetorheological.

3. An accessory drive system according to claim 2, wherein said magnetic field is controlled by an electronic controller, which applies current to a coil disposed about said selectively restricted orifice such that rotational motion of the arm is restricted during periods of operation characterized by rapid engine deceleration.

4. An accessory drive system according to claim 1, wherein said magnetic field is controlled by an electronic controller, which applies current to a coil disposed about said selectively restricted orifice such that rotational motion of the arm is restricted when engine speed exceeds a predetermined value.

5. An accessory drive system according to claim 1, wherein said electronic field comprises a force field created by powered electrodes in contact with an electrorheological field.

6. An accessory drive system for an automotive engine, comprising:

a drive pulley attached to an output shaft of the engine;

a flexible drive belt for connecting the drive pulley with a plurality of driven pulleys, with one driven pulley located upon each of a plurality of driven devices;

a tensioner for maintaining the drive belt in contact with each of said drive and driven pulleys, with said tensioner comprising an arm which is rotatably mounted to the engine and which has a wheel for contacting the drive belt, with the wheel being urged into contact with the drive belt by the arm, and with said tensioner further comprising a governor for controlling the rotational motion of the arm by selectively resisting motion of the arm in both directions in response to a magnetic field applied to a magnetorheological fluid contained within said governor; and an electronic controller for applying said magnetic field in response to at least one sensed engine parameter, so as to increase the viscosity of magnetorheological fluid flowing through an orifice after being displaced by a piston coupled to the arm and slidably mounted in a cylinder within the governor such that movement of the arm away from the drive belt will effectively be prevented in the event that the value of the sensed parameter indicates that the engine is operating in a mode in which the tension would otherwise be decreased.

7. An accessory drive system according to claim 6, wherein said electronic controller operates said governor such that rotational motion of the arm is restricted during periods of operation characterized by rapid engine deceleration.

8. An accessory drive system according to claim 6, wherein said electronic controller operates said governor such that rotational motion of the arm is restricted when engine speed exceeds a predetermined value.

9. A method for controlling the tension of a flexible drive belt in an accessory drive system for an automotive engine, comprising the steps of:

sensing at least one engine operating parameter indicative of engine operation in a mode tending to decrease tension in the drivebelt below a threshold at which traction of the belt is adequate to avoid slipping of the belt; and upon sensing a value of said at least one operating parameter corresponding to a value of drive belt tension below said threshold, directing an electric current to a coil disposed about a selectively restricted orifice such that a flow of a magnetorheological fluid through said orifice resulting from movement of a piston in response to rotational movement of a tensioner coupled to the piston and associated with said accessory drive system will be restricted, such that the tensioner will noncompliantly tension the drive belt so as to prevent the tension from decreasing.

* * * * *